United States Patent [19]

McCracken

[11] Patent Number: 5,178,439
[45] Date of Patent: Jan. 12, 1993

[54] CHILD SAFETY BELT SLEEVE

[76] Inventor: Richard S. McCracken, 3950 Princeton Rd., Montgomery, Ala. 36111

[21] Appl. No.: 852,972

[22] Filed: Mar. 17, 1992

[51] Int. Cl.⁵ .............................................. B60R 22/00
[52] U.S. Cl. ...................................... 297/482; 297/483
[58] Field of Search ...................... 297/482, 483, 468; 280/808, 801

[56] References Cited

U.S. PATENT DOCUMENTS

| | | |
|---|---|---|
| 3,713,693 | 1/1973 | Cadiou .............................. 297/482 X |
| 3,891,274 | 6/1975 | Cook et al. ........................... 297/482 |
| 4,502,732 | 3/1985 | Williams . |
| 4,610,463 | 9/1986 | Efrom . |
| 4,643,474 | 2/1987 | Wise et al. . |
| 4,749,229 | 6/1988 | Dorto . |
| 4,832,367 | 5/1989 | Lisenby ........................... 297/483 X |
| 4,921,273 | 5/1990 | Weightman et al. ............. 297/482 X |

FOREIGN PATENT DOCUMENTS 2290919 6/1976 France ................................. 297/483

Primary Examiner—Peter R. Brown
Attorney, Agent, or Firm—Richard C. Litman

[57] ABSTRACT

A child safety belt sleeve for use with an existing automobile safety belt. The sleeve includes a pliable funnel-shaped frame structure in which the safety belt may be releasably inserted prior to the fastening of the safety belt. The sleeve facilitates in the proper orientation of the safety belt across the lap and chest area of a child. The funnel-shaped frame structure may include an adjustment to ensure that the sleeve is oriented in accordance with the particular girth of the child being restrained. The funnel-shaped structure may be provided with a protective cover which also enhances the aesthetic appearance of the sleeve. The sleeve provides a frontal barrier for children who have outgrown safety restraint seats yet are still not physically mature enough to effectively use a factory installed seat belt.

9 Claims, 3 Drawing Sheets

CHILD SAFETY BELT SLEEVE

BACKGROUND OF THE INVENTION

1. Field of the Invention

The present invention relates to a child safety belt sleeve for use with a combined automobile lap belt and shoulder strap assembly to provide a frontal barrier for restraining and protecting a seated child who has become too large for a portable safety restraint seat, yet is still too small to effectively use an automobile safety belt assembly which has been primarily designed for adult use.

2. Description of Prior Art

Various types of child restraint devices which restrain children in a seated position in automobiles are known in the prior art. These devices are primarily designed to protect the child during emergency situations. Existing devices may embody cushioned or padded seats which include lap and shoulder harnesses which are designed to confine the child to the seat when the automobile is involved in an accidental collision or when the automobile is forced to come to an emergency stop. Some devices are employed in the place of portable car seats and are adapted to overlie the waist area of the seated child. The existing automobile safety belt assembly is typically used in cooperation with most child restraint devices which hold the child securely in the seat in the event of an accident.

Most child restraint devices are generally bulky, therefore, occupy a great deal of space when either in use or in storage. Bulky child restraint devices may also be more costly to manufacture as well because of the type of material or the amount of material used in the fabrication process. In addition, the complexity of some of these devices may invite them to be difficult and time consuming to use.

U.S. Pat. No. 4,502,732 issued Mar. 5, 1985 to Glen Williams discloses and child car restraint device used in conjunction with an existing automobile safety belt. The device has a lower shell area adapted to cover the lap of the seated child and an upper shell area adapted to cover the torso of the seated child.

U.S. Pat. No. 4,610,463 issued Sep. 9, 1986 to Harriet Efrom describes a protection assembly in the form of a domelike shield used to protect the abdominal area of a pregnant woman when seated in an automobile. The device absorbs impact forces and transfers these impact forces to the supporting seat, thus reducing the amount of force absorbed by the abdominal area.

U.S. Pat. No. 4,643,474 issued Feb. 17, 1987 to Robert D. Wise discloses a car booster seat and restraint system for children which is installed in cooperation with an existing automobile safety belt assembly.

U.S. Pat. No. 4,749,229 issued Jun. 7, 1988 to Andrew J. Dorto describes a child restraint seat which is designed for use with an existing conventional automobile seat and its respective safety restraint assembly.

None of the above inventions and patents, taken either singly or in combination, is seen to describe the instant invention as claimed.

SUMMARY OF THE INVENTION

The present invention relates to a child safety belt sleeve for use in conjunction with an existing automobile safety belt assembly. The safety belt sleeve is symmetrical about a selected plane to enable it to be used with a right or left lap belt and shoulder strap. The sleeve is comprised a pliable, frustoconical-shaped or funnel-shaped frame structure and cover. The frame structure is preferably fabricated from a material similar to that material used within the automobile industry to produce existing factory installed safety belt assemblies. A combined lap belt and shoulder strap assembly are removably inserted into and through the sleeve prior to fastening the safety belt. With a child is positioned on the respective automobile seat. The safety belt is then drawn across the lap and shoulder of the child and is buckled such that the child safety belt sleeve forms a trapezoidal-shaped frontal barrier which is oriented proximate the lap and chest area of the child. The sleeve could be provided with restraint straps which are secured to the frame structure at one end and are releasably fastened to both the lap belt and the shoulder strap at an opposite end to prevent any inadvertent motion of the sleeve. The sleeve could also be provided with an adjustment disposed adjacent each end of the funnel-shaped frame structure to ensure the proper orientation of the shoulder strap in accordance with the girth of the particular child being restrained. The sleeve provides a frontal barrier to restrain a seated child who has outgrown a portable safety restraint seat but is still not physically mature enough to effectively use an automobile safety belt assembly which has been more specifically designed for use by an adult. The cover is also funnel-shaped and may be removably attachable or permanently attached to the frame structure. The cover enhances the aesthetic appearance of the sleeve as well as protects the frame structure against soil. The cover is preferably produced from a washable material so that its attractive appearance may be easily maintained. This sleeve is economical to produce, it is functional in virtually any automobile having a combine lap belt and shoulder strap, and it is adaptable to accommodate a child sitting either in the front seat or the back seat. Furthermore, the sleeve assembly is simple to install and remove and is very compact, therefore, occupies little space when not in use.

Accordingly, one object of the present invention is to provide a child safety belt sleeve for use in conjunction with an existing factory installed automobile safety belt assembly and more specifically, to provide a child safety belt sleeve for use with children who have outgrown portable safety restraint seats but are not physically mature enough to use an automobile safety belt assembly which is designed more specifically for adult use.

Another object of the present invention is to provide a child safety belt sleeve that offers a frontal barrier which is oriented proximate the lap and chest area of the child and which prevents the shoulder strap from slipping into a compromising position, thus reducing the risk of possible injury to the face or neck of the child in the event of an abrupt stop or an accidental collision.

Another object of the present invention is to provide a sleeve assembly which is simple to install and remove and is very compact, therefore, occupies little space when not in use.

Another object of the present invention is to provide a child safety belt sleeve which includes a frame structure which is preferably fabricated from a material that meets the same safety standards as that material which is used to produce existing factory installed safety belt assemblies within the automobile industry.

Another object of the present invention is to provide an adjustment of the frame structure which would ensure the proper orientation of the shoulder strap in accordance with the particular girth of the child being restrained.

Yet another object of the present invention is to provide cover which may be removably attachable to the frame structure and which enhances the aesthetic appearance of the same.

Still another object of the present invention is to provide a washable cover which protects the frame structure against soil.

Further, an object of the present invention is to provide a sleeve which is economical to produce, adaptable to be used in virtually any automobile having a combined lap belt and shoulder strap, and which is also capable of accommodating a child sitting either in the front seat or the back seat of the automobile.

These and other objects of the present invention will become readily apparent upon further review of the following specification and drawings.

BRIEF DESCRIPTION OF THE DRAWINGS

FIG. 6b is a perspective view of a snap hook which is used in combination with the retainer of FIG. 6a.

Similar reference characters denote corresponding features consistently throughout the attached drawings.

DETAILED DESCRIPTION OF THE PREFERRED EMBODIMENTS

Figure 1:
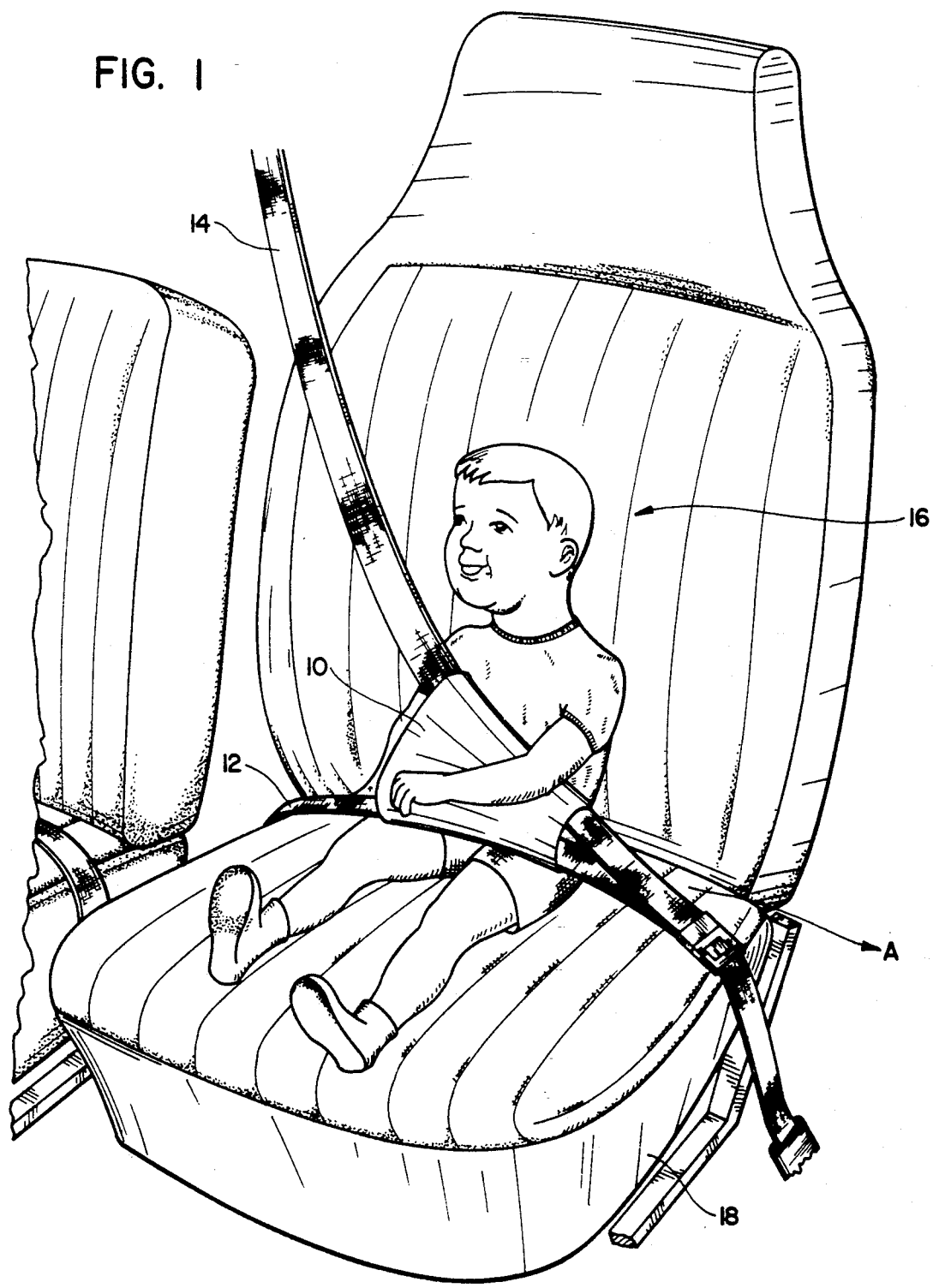
FIG. 1 is an environmental perspective view of the present invention.

Now referring to the drawings, FIG. 1 shows a child safety belt sleeve 10 for use in cooperation with an existing automobile lap belt 12 and shoulder strap 14 combination. The sleeve 10 is symmetrical about a selected plane so that the same sleeve 10 may be used on a right or left lap belt 12 and shoulder strap 14 combination. The sleeve 10 functions to reduce a risk of possible injury to a child seated in an automobile and more particularly, functions to reduce a risk of potential injury induced by a factory installed lap belt 12 and shoulder strap 14 which are not adequately designed for use by children of all ages.

Figure 3:
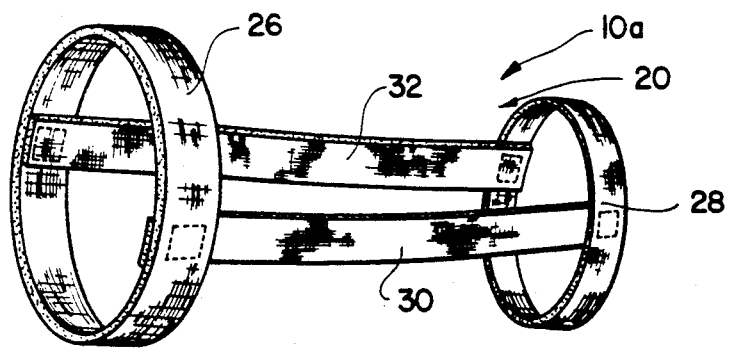
FIG. 3 is a side elevational view showing a alternative embodiment including the structural frame independent of a cover.
Figure 2:
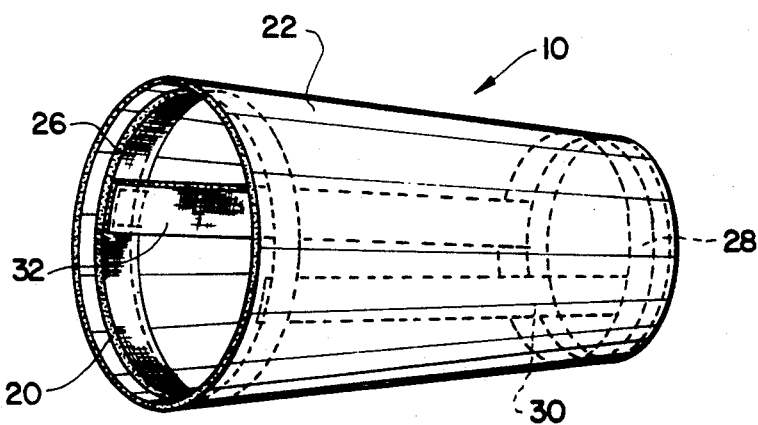
FIG. 2 is a side elevational view showing the preferred embodiment of the present invention which includes a frame structure as shown in FIG. 3 and a cover.

The preferred embodiment of the sleeve 10, as shown in FIGS. 1 and 2, includes a frustoconical-shaped or funnel-shaped frame structure 20 as shown in FIG. 3 and a cover 22. The cover 22 is funnel-shaped to configure to the outer periphery of the frame structure 20. This cover 22 is purposed to enhance the aesthetic appearance of the sleeve 10. The cover 22, preferably fabricated from a soft, durable, machine washable material, further protects the frame structure 20 against soil.

FIG. 3 shows an alternative embodiment of the same frame structure 20 used in the preferred embodiment but independent of the cover 22 shown in FIGS. 1 and 2. The sleeve 10a is comprised of merely a pliable funnel-shaped frame structure 20. The frame structure 20 is preferably fabricated from a material similar to that material used within the automobile industry to fabricate factory installed lap belts 12 and shoulder straps 14. The frame structure 20 is comprised of a first ring 26 defining a first end of the frame structure 20 and a second ring defining a second end 28 of the frame structure 20. The first and second rings 26,28 are joined together by first and second parallel longitudinal members 30, 32, each transversely connected to the first and second rings 26,28 approximately 180 degrees apart. The first ring 26 is significantly larger than the second ring 28, thus by joining the two rings 26,28 in this manner, the funnel-shaped frame structure 20 is formed. The combined lap belt 12 and shoulder strap 14 are removably inserted into and through the sleeve 10a in the direction A prior to fastening the safety belt 12. With a child 16 positioned on the respective automobile seat 18 (as shown in FIG. 1), the lap belt 12 and shoulder strap 14 are drawn across the lap and shoulder of the child 16 and the combination thereof is buckled in such a manner that the child safety belt sleeve 10a forms a trapezoidal-shaped frontal barrier which is oriented proximate the lap and chest area of the child 16.

Figure 4:
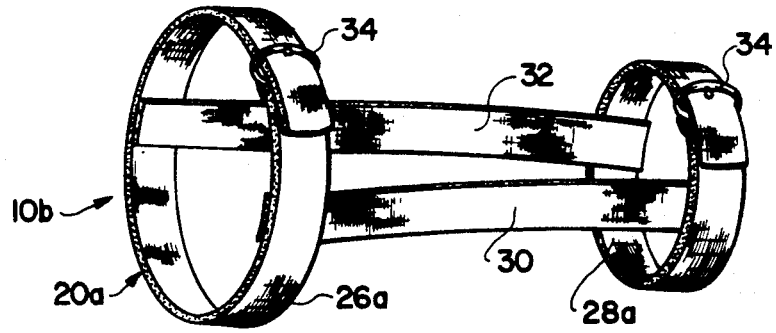
FIG. 4 is an environmental perspective view showing an alternative structural frame including an adjustment means.

FIG. 4, shows another alternative embodiment which provides an adjustment means 34, such as a buckle-type fastener, for each ring 26a,28a of the funnel-shaped frame structure 20a. The adjustment means 34 ensures the proper orientation of the shoulder strap 14 in accordance with the girth of the particular the child 16 being restrained (as shown in FIG. 1). The sleeve 10b provides a frontal barrier to restrain a seated child 16 who has outgrown a portable safety restraint seat (not shown) but is not quite physically mature enough for the combined automobile lap belt 12 and shoulder strap 14 which have been designed more specifically for use by an adult.

Figure 5:
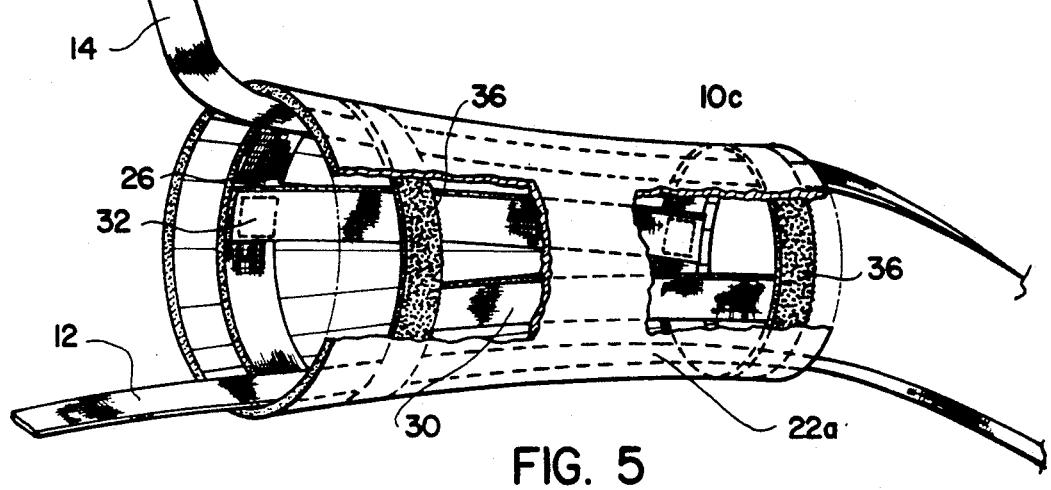
FIG. 5 is an environmental perspective view showing yet another alternative embodiment including the combined structural frame and a removably attachable cover.

FIG. 5 shows another alternative embodiment having a removable cover 22a which is removably attachable to either frame structure 20,22a by a fastening means 36 such as a hook and loop type fastener.

Figure 6A:
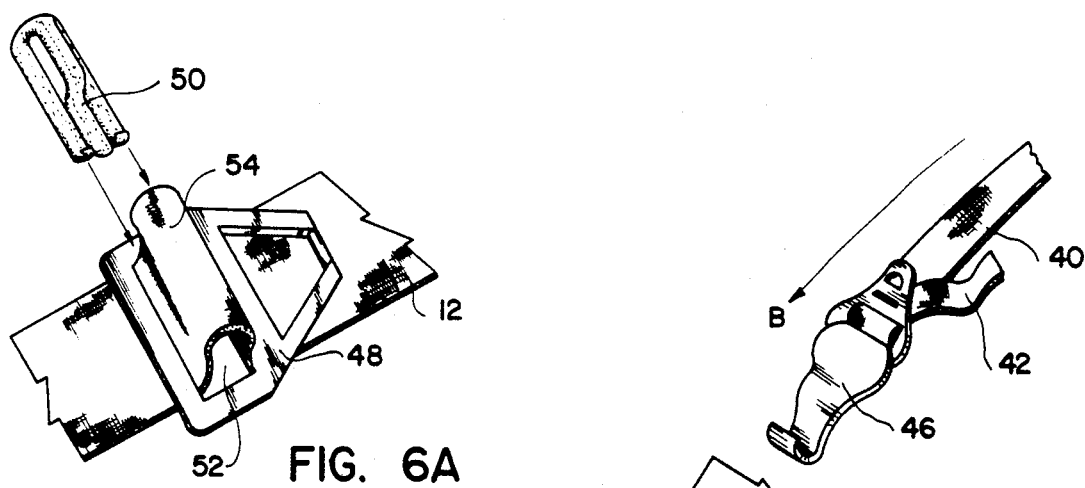
FIG. 6a is a perspective view of a releasably attachable retainer and a respective keeper.
Figure 6B:
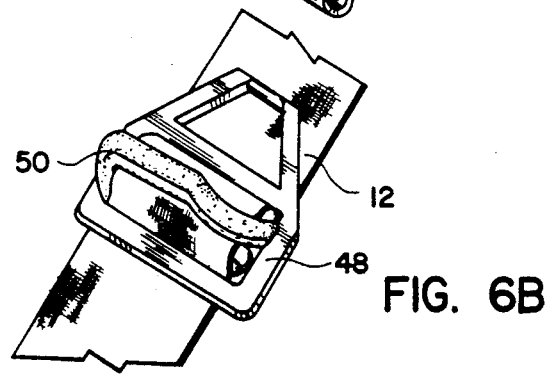
Figure 6C:
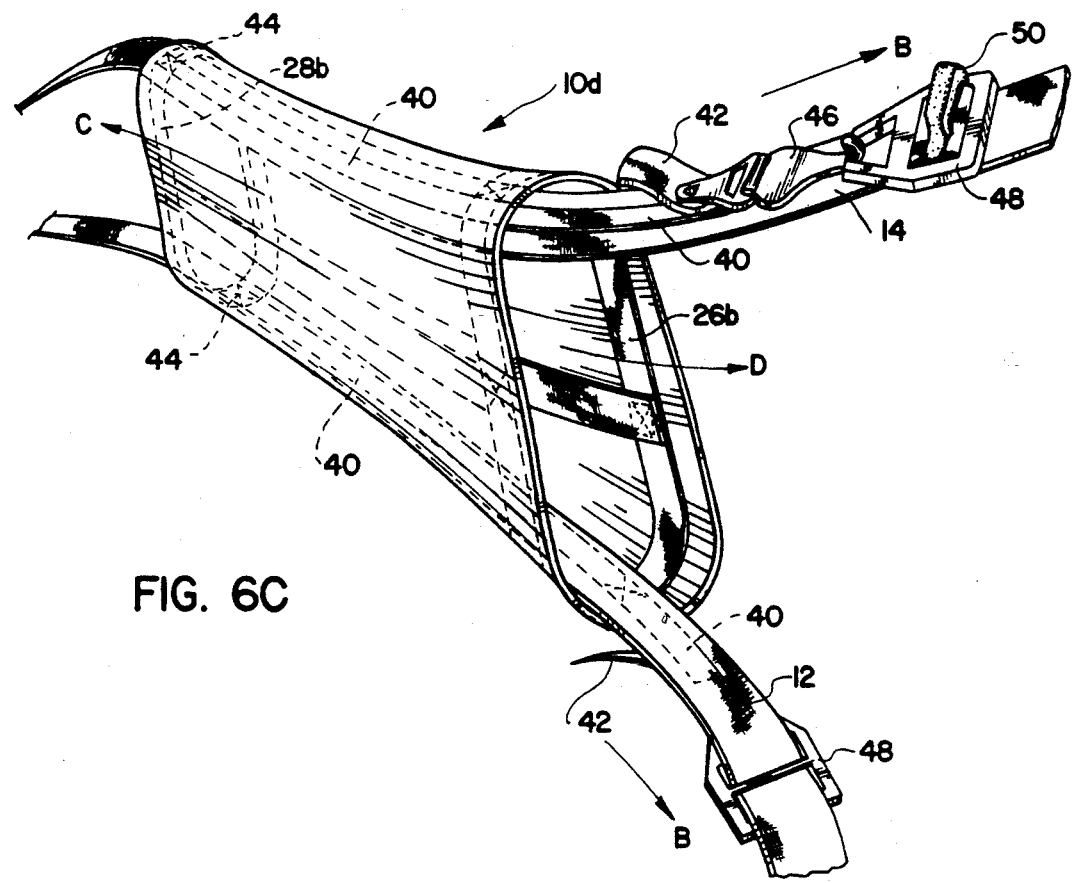
FIG. 6c is a perspective view of an alternative embodiment employing a retainer strap.

FIG. 6a shows a retainer 48 which is releasably attachable to a lap belt 12 by pulling a segment of the lap belt 12 through an opening 52 in the retainer 48 to form a loop 54. A keeper 50 is clipped onto the loop 54 formed by the lap belt 12 to maintain the retainer 48 in a fixed position on the lap belt 12. A retainer 48 is releasably attached to a shoulder strap 14 in the manner. FIG. 6b shows a first end 42 of a retainer strap 40 having a snap hook 46 attached thereon. The snap hook 46 is engagable with the retainer 48 as shown in FIG. 6c. FIG. 6c further shows each strap 40, including a second end 44. The second end 44 and an intermediate portion of the restraint strap 40 are both secured to each ring 26b,28b of the sleeve 10d. With the lap belt 12 and the shoulder strap 14 inserted into and through the sleeve 10d, the restraint straps 40 are pulled in the direction B and are fastened to the lap belt 12 and the shoulder strap 14 via the mating snap hooks 46 and retainers 48. These retainer straps 40 prevent the sleeve 10d from inadvertently moving in the direction C and the angle formed between the lap belt 12 and shoulder strap 14 restricts the movement of the sleeve 10d in the direction D.

Referring to FIGS. 1-5 and 6c, the sleeve 10,10a,10b,10c,10d is economical to produce, is functional in virtually any automobile having a combined lap belt 12 and shoulder strap 14, and accommodates children 16 sitting in either the front seat or the back seat. Furthermore, the sleeve 10,10a,10b,10c,10d is simple to install and remove and is very compact, therefore, occupies little space when not in use.

It is to be understood that the present invention is not limited to the embodiments described above, but encompasses any and all embodiments within the scope of the following claims.

I claim:

1. A child safety belt sleeve for use with an existing automobile safety restraint assembly to restrain a seated child in an automobile seat, said child safety belt sleeve comprising:
   a) a pliable funnel-shaped frame structure in which the automobile safety restraint assembly is removably inserted, whereby the safety belt is drawn across the seated child and is fastened such that said child safety belt sleeve is oriented proximate the chest area of the child; and
   b) a pliable funnel-shaped cover which is slightly larger in diameter than said funnel-shaped frame structure, whereby when said funnel-shaped frame structure is removably inserted into said cover, said cover provides an aesthetically appealing appearance.

2. The child safety belt sleeve according to claim 1, wherein said pliable funnel-shaped frame structure includes first and second rings arranged parallel to one another and joined together a predetermined distance apart by first and second transverse longitudinal members being disposed 180 degrees apart.

3. The child safety sleeve according to claim 2, wherein said first and second rings each have a means to independently adjust the diameter thereof whereby said first and second rings are adjustable to ensure the proper orientation of the automobile safety restraint assembly in accordance with the seated child being restrained.

4. A child safety belt sleeve for use with an existing automobile safety restraint assembly to restrain a seated child in an automobile seat, said child safety belt sleeve comprising:
   a) a pliable funnel-shaped frame structure in which the automobile safety restraint assembly is removably inserted, whereby the safety belt is drawn across the seated child and is fastened such that said child safety belt sleeve is oriented proximate the chest area of the child; and
   b) a first and second restraint strap, each having a first and second end and an intermediate portion therebetween, said first end of each of said first and second restraint straps includes a means to releasably fasten said restraint strap to said lap belt and said shoulder strap, respectively, a predetermined distance from said sleeve, and said intermediate portion and said second end of each of said restraint straps are secured to said first and second rings of said frame structure such that said first and second restraint straps are disposed along said lap belt and said shoulder strap, respectively, whereby said lap belt and said shoulder strap are inserted into and through said sleeve and said restraint straps are fastened to prevent said sleeve from inadvertently moving towards a point where said lap belt and said shoulder strap converge.

5. The child safety belt sleeve according to claim 4, further including a pliable funnel-shaped cover attached to said funnel-shaped frame structure to provide protection for said funnel-shaped frame structure and to provide an enhanced aesthetic appearance for said funnel-shaped frame structure.

6. A child safety belt sleeve for use in cooperation with an existing factory installed automobile lap belt and shoulder strap combination to provide a frontal barrier to restrain a seated child who is too large for an automobile safety restraint seat and is not physically mature enough to effectively use the existing factory installed automobile lap belt and shoulder strap combination, said child safety belt sleeve comprises:
   a) a pliable, substantially funnel-shaped frame structure including:
      1) a first ring defining a first end of said funnel-shaped frame structure;
      2) a second ring being noticeably smaller than said first ring and defining a second end of said funnel-shaped frame structure;
      3) first and second longitudinal members, connected transverse to said first and second rings approximately 180 degrees apart, joining said first ring parallel to said second ring a predetermined distance apart, thus forming said funnel-shaped frame structure;
   b) an means for independently adjusting said first ring and said second ring whereby said means for adjusting said first ring and said second ring ensure the proper orientation of the shoulder strap in accordance with a particular girth of the child being restrained; and
   c) a pliable, substantially funnel-shaped cover which has a configuration conforming with an outer periphery of said funnel-shaped frame structure and which provides an aesthetically pleasing appearance and protects said funnel-shaped frame structure against soil, said cover being fabricated from a soft, durable, washable material to enable said aesthetically pleasing appearance to be maintained.

7. The child safety belt sleeve according to claim 6, wherein said funnel-shaped frame structure is fabricated from a material similar to that material used to fabricate the existing factory installed lap belt and shoulder strap combination.

8. The child safety belt sleeve according to claim 6, said pliable, substantially funnel-shaped cover is removably attachable to said substantially funnel-shaped frame structure.

9. The child safety sleeve according to claim 6, further includes a first and second restraint strap, each having a first and second end and an intermediate portion therebetween, said first end of each of said first and second restraint straps includes a means to releasably fasten said restraint strap to said lap belt and said shoulder strap, respectively, a predetermined distance from said sleeve, and said intermediate portion and said second end of each of said restraint straps are secured to said first and second rings of said frame structure such that said first and second restraint straps are disposed along said lap belt and said shoulder strap, respectively, whereby said lap belt and said shoulder strap are inserted into and through said sleeve and said restraint straps are fastened to prevent said sleeve from inadvertently moving towards a point where said lap belt and said shoulder strap converge.

* * * * *